(12) United States Patent
Ollila et al.

(10) Patent No.: US 8,593,398 B2
(45) Date of Patent: Nov. 26, 2013

(54) APPARATUS AND METHOD FOR PROXIMITY BASED INPUT

(75) Inventors: Elina Ollila, Helsinki (FI); Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 572 days.

(21) Appl. No.: 12/823,291

(22) Filed: Jun. 25, 2010

(65) Prior Publication Data

US 2011/0316790 A1 Dec. 29, 2011

(51) Int. Cl.
*G06F 3/01* (2006.01)
(52) U.S. Cl.
USPC .......................................................... 345/156
(58) Field of Classification Search
None
See application file for complete search history.

(56) References Cited

U.S. PATENT DOCUMENTS

| | | | |
|---|---|---|---|
| 6,243,054 B1 | 6/2001 | DeLuca | |
| 6,559,813 B1 | 5/2003 | DeLuca | |
| 7,411,575 B2 | 8/2008 | Hill et al. | |
| 7,532,196 B2 | 5/2009 | Hinckley | |
| 8,077,157 B2 * | 12/2011 | Sengupta et al. | 345/173 |
| 2007/0146347 A1 | 6/2007 | Rosenberg | |
| 2008/0152263 A1 | 6/2008 | Harrison | |
| 2008/0165140 A1 | 7/2008 | Christie et al. | |
| 2009/0140986 A1 | 6/2009 | Karkkainen et al. | |
| 2009/0309846 A1 | 12/2009 | Trachtenberg et al. | |
| 2010/0165965 A1 | 7/2010 | Carlton et al. | |

OTHER PUBLICATIONS

International Search Report for International Application No. PCT/FI2011/050571, mailed Dec. 9, 2011.
Hardy, R. et al., *Touch & Interact: Touch-based Interaction of Mobile Phones with Displays*, Mobile HCI 2008, Amsterdam, the Netherlands, (Sep. 2008), pp. 245-254.
Hilliges, O. et al., *Interactions in the Air: Adding Further Depth to Interactive Tabletops*, UIST '09, Victoria, BC, Canada, (Oct. 2009), pp. 139-148.
Rekimoto, J., *Pick-and-Drop: A Direct Manipulation Technique for Multiple computer Environments*, UIST 97, Banff, Alberta, Canada, (1997), pp. 31-39.

* cited by examiner

*Primary Examiner* — Joseph Haley
(74) *Attorney, Agent, or Firm* — Alston & Bird LLP (57) ABSTRACT

In accordance with an example embodiment of the present invention, a method is provided for transferring information items between communications devices. A source device detects a selection input by an input object. Direction of movement of the input object is detected after the selection input. A target device is identified on the basis of the direction of movement of the input object. The target device is connected for transferring an information item associated with the selection input.

19 Claims, 6 Drawing Sheets

APPARATUS AND METHOD FOR PROXIMITY BASED INPUT

FIELD

An embodiment of the present invention relates to an apparatus and a method for detecting proximity based input.

BACKGROUND

Touch screens are used in many portable electronic devices, for instance in PDA (Personal Digital Assistant) devices, tabletops, and mobile devices. Touch screens are operable by a pointing device (or stylus) and/or by finger. Typically the devices also comprise conventional buttons for certain operations.

Three dimensional (3D) content display techniques and 3D interaction, or sense of 3D interaction, have been under development also for portable electronic devices. It has been suggested to apply also the space above a touch screen surface as further means for user inputs. People who are using mobile devices generally wish to have more versatile and intuitive ways to interact with their devices.

SUMMARY

Various aspects of examples of the invention are set out in the claims.

According to an example aspect, an apparatus is provided, comprising at least one processor; and at least one memory including computer program code, the at least one memory and the computer program code configured to, with the at least one processor, cause the apparatus at least to perform: detect a selection input by an input object selecting an information item, detect direction of movement of the input object after the selection input, identify a target device on the basis of the direction of movement of the input object, and causing an operative connection with the target device for transferring the information item to the target device.

According to another example aspect, an apparatus is provided, comprising at least one processor; and at least one memory including computer program code, the at least one memory and the computer program code configured to, with the at least one processor, cause the apparatus at least to perform: receive direction information associated with direction of movement of an input object from a source device, identify an input object on the basis of the received direction information, and in response to detecting a release input by the identified input object, causing an operative connection with the source device to initiate transmission of an information item associated with the input object from the source device.

According to another aspect, a method is provided, comprising: detecting by a source device a selection input by an input object selecting an information item, detecting direction of movement of the input object after the selection input, identifying a target device on the basis of the direction of movement of the input object, and causing an operative connection with the target device for transferring the information item to the target device.

According to a still further aspect, there is provided a method, comprising: receiving direction information associated with direction of movement of an input object from a source device, identifying an input object on the basis of the received direction information, and in response to detecting a release input by the identified input object, causing an operative connection with the source device to initiate transmission of an information item associated with the input object from the source device.

According to an embodiment, presence of the input object in close proximity to an input surface is detected, the detection of the selection input is arranged based on detecting a grab hovering gesture by the input object, and the detection of the direction of movement of the object is arranged based on detecting the direction of hovering of the input object.

According to another example embodiment, the source device determines positions of nearby devices in relation to the position of the source device. At least one device positioned in the direction of the movement of the input object is selected as the target device. In response to detecting movement of the input object towards the target device, the target device is informed of the approaching input object and/or the information item.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
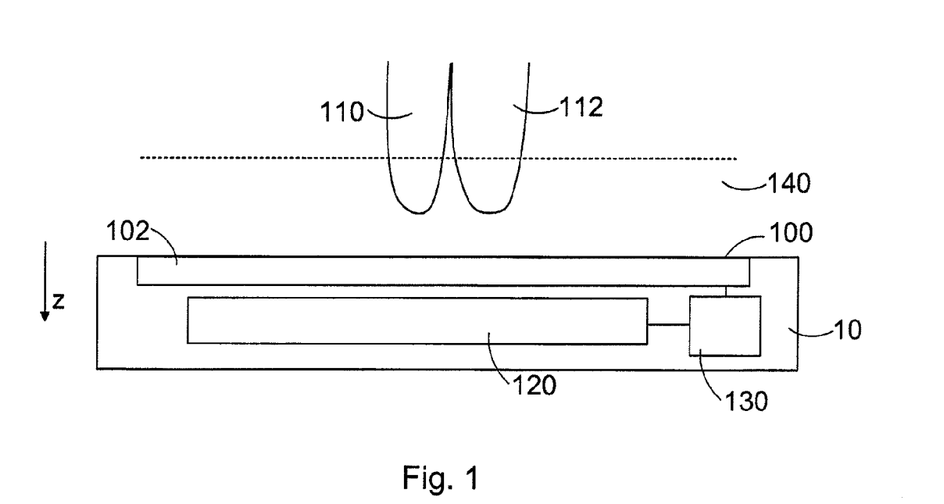
FIG. 1 is a simplified block diagram of a side view of an input apparatus in accordance with an example embodiment of the invention.

FIG. 1 illustrates an example apparatus 10 with one or more input and/or output devices. The input devices may for example be selected from buttons, switches, sliders, keys or keypads, navigation pads, touch pads, touch screens, and the like. The output devices may be selected from displays, speakers, indicators, for example. The apparatus 10 may be a peripheral device, such as a keyboard or mouse, or integrated in an electronic device. Examples of electronic devices include any consumer electronics device like computers, media players, wireless communications terminal devices, and so forth.

The apparatus 10 may comprise a proximity detection system or unit 120 configured to detect when at least one input object 110, 112, such as a finger or a stylus, is brought in close proximity to, but not in contact with, an input surface 100 of an input device 102. The input surface 100 may be a surface of a touch screen or other input device of the apparatus capable of detecting user inputs.

A sensing area 140 may illustrate the approximate area and/or distance at which an object 110, 112 is detected to be in close proximity to the surface 100. The sensing area 140 may also be referred to as a hovering area and introduction of the object 110, 112 to the hovering area and possible furthey (non-touch) inputs by the object 110, 112 in the hovering area may be referred to as hovering. In some embodiments the hovering area 140 enables also inputting and/or accessing data in the apparatus 10, even without touching the input surface 100. For instance, information items may be selected and/or moved in response to detecting an associated hovering input.

In some embodiments the proximity detection system 120 generates a sensing field by one or more proximity sensors. In one example embodiment a capacitive proximity detection system is applied, whereby the sensors are capacitive sensing nodes. Disturbances by one or more objects 110, 112 in the sensing field are monitored and presence of one or more objects is detected based on detected disturbances. The capacitive detection system detects changes in capacitance above the input surface 100.

However, it will be appreciated that the present features are not limited to application of any particular type of proximity detection. The proximity detection system 120 may be based on infrared proximity detection, optical shadow detection, acoustic emission detection, ultrasonic detection, or any other suitable proximity detection technique. For instance, in case the proximity detection system 120 would be based on infrared detection, the system would comprise one or more emitters sending out pulses of infrared light. One or more detectors would be provided for detecting reflections of that light from nearby objects 110, 112. If the system detects reflected light, then an object is assumed to be present.

The proximity detection system 120 may be arranged to estimate the distance of an object 110, 112 from the input surface 100, which enables to provide z coordinate data of the location of the object in relation to the input surface and to detect movement of the object in the z direction. The proximity detection system 120 may generate information on x, y position of the object 110 in order to be able to determine a target graphical user interface (GUI) item or area of a hovering input. X and y directions are generally substantially parallel to the input surface 100, and the z direction is substantially normal to input surface 100.

Depending on the technique applied, the size of the apparatus and the input surface, and the desired user interaction, the hovering area 140 may be arranged to extend from the input surface 100 by distance selected from some millimeters to even up to multiple dozens of centimeters, for instance. The proximity detection system 120 may be arranged to determine properties of the object for identifying an input object. Further, in addition to detecting finger(s), the proximity detection system 120 may be arranged to detect also further parts of user's hand, and the system may be arranged to recognize false inputs and avoid further actions.

In some embodiments the proximity detection system 120 is configured to detect and indicate simultaneous proximity of multiple objects 110, 112. Each of the objects 110, 112 detected simultaneously in the hovering area 140 may be associated with at least one action or functionality, which is initiated in response to a further input by the respective object.

The apparatus 10 further comprises or is coupled to a controller 130. The proximity detection system 120 may be coupled to the controller 130 via a control circuitry. The proximity detection system 120 is configured to provide signals for the controller 130 when an object 110, 112 is entered and/or moved in the hovering area 140. Based on such input signals, commands, selections and other types of actions may be initiated, typically causing visible, audible and/or tactile feedback for a user. The controller 130 may also be connected to one or more output devices, such as a display. The controller 130 may be configured to control different application views on a display. The controller 130 may also be configured to communicate and/or control further devices inside or outside the apparatus 10, such as a transceiver to send and receive information to and from other communications devices. For example, the controller 130 may be arranged to control at least some of the functions illustrated below in connection with FIGS. 3 to 8. It will be appreciated that the controller 130 functions may be implemented by a single control unit or a plurality of control units.

In some embodiments, the proximity detection system 120 is provided in an apparatus comprising a touch screen display. Thus, the input surface 100 may be a surface of a touch screen. The touch screen comprises a plurality of touch sensitive detectors to detect inputs to screen display surface portions. Signals from the touch sensitive detectors may be provided to the controller 130 or another controller to provide further user input. The controller 130, or another controller, may also control the display of GUI items on the touch screen.

It will be appreciated that the apparatus 10 may comprise various further elements not discussed in detail herein. For instance, the apparatus 10 may comprise one or more video cameras for monitoring user actions, such as movement of the input object 110, 112 in the z direction. Although the apparatus 10 and the controller 130 are depicted as a single entity, different features may be implemented in one or more physical or logical entities. There may be further specific functional module(s), for instance for carrying one or more of the functions described in connection with FIGS. 3 to 8.

Methods, apparatuses, a system, and computer programs are now provided for transferring information items from a source device to a target device on the basis of detected direction of movement of an input object.

Figure 2:
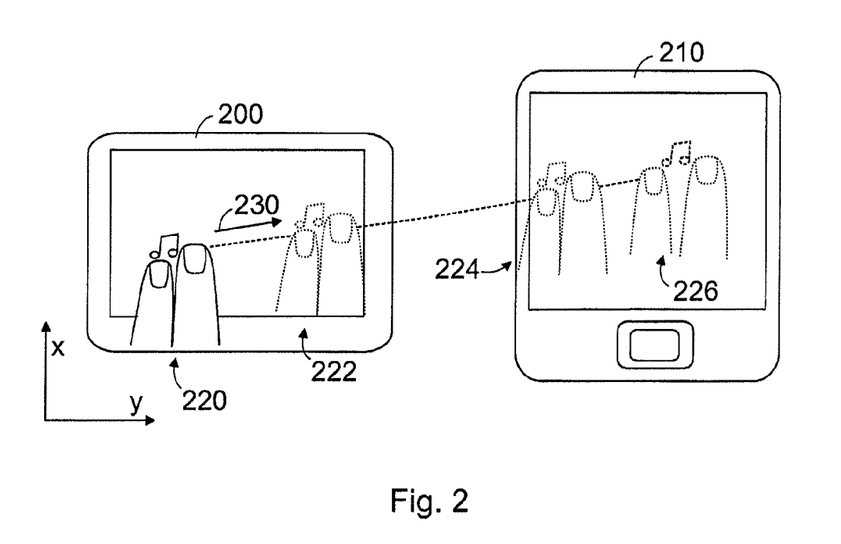
FIG. 2 illustrates transferring of information items between electronic devices in accordance with an example embodiment.
Figure 3:
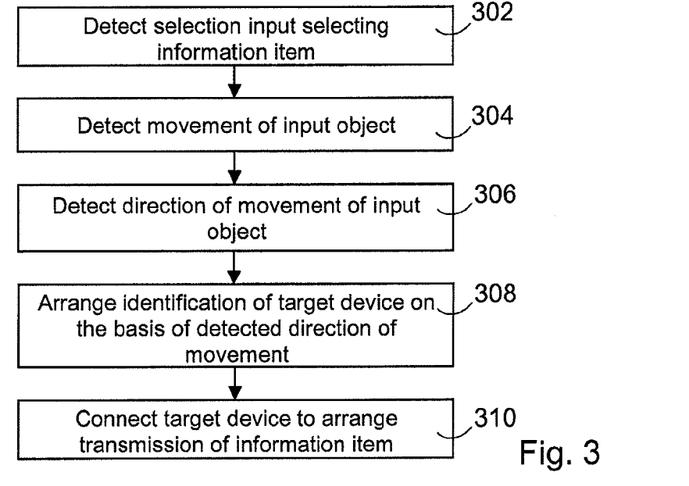
FIGS. 3 to 5 illustrate methods according to some example embodiments.

FIG. 2 illustrates an example embodiment for transferring information items between electronic devices 200, 210. The electronic devices may comprise the apparatus 10 illustrated above. Reference is also made to FIG. 3 illustrating a method, which may be carried out as a control algorithm in the source device 200, for instance.

The source device 200 is arranged to detect 302 a selection input 220 by one or more input objects and associated with one or more information items. For instance, the user may select a music file indicated by an icon on the touch screen by touching the icon or performing a hovering selection action.

The source device 200 is further arranged to detect 304 subsequent movement 222 of the input object. The direction 230 of the subsequent movement 222 of the object, associated with holding the information item after the selection input, is detected 306. The controller 130 may be arranged to determine 306 the direction of movement on the basis of consecutive x, y positions of the input object, e.g., movement substantially in the lateral direction. The controller may be arranged to determine direction of movement of the input object touching the input surface 100 or hovering in the hovering area 140 after detecting the selection of the information item. It is to be noted that the selection input 220, 302 may be a specific grab input automatically triggering the monitoring of movement 306 of the input object to determine the direction.

At least one target device 210 is identified 308 based on the detected direction 230 of movement of the input object holding the information item. After identifying the target device, an operative connection with the target device may be established 310 to transmit the information item to the target device. For example, a short-range radio connection may be established between the devices 200, 210. This enables a simple and intuitive interaction method for a user to share information items between devices. The user does not need to separately select the target device in advance, but can just start moving the information item towards the target device. Further, the user does not need to select or pair the target device via menu operations, and the user can change a target "on the fly" without requiring specific actions for connection establishment or cancelling a connection with a previous target device.

In one example embodiment the source device 200 may in block 308 directly identify the target device on the basis of detected direction 230 and relative positions of nearby devices. The identified target device may then be caused to be operatively connected, and the source device may transmit the information item or inform the target device of the information item and/or the approaching input object 110.

Figure 4:
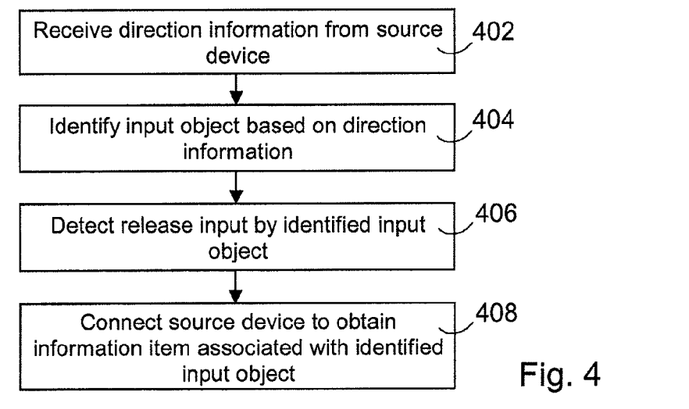

In another example embodiment the source device may in block 308 send information associated with the detected direction 230 of movement to one or more nearby devices to arrange the identification. Actions in the target device related to this embodiment are also illustrated in FIG. 4.

Direction information associated with direction of movement of an input object is received 402 from a source device. Direction of movement of input objects is monitored for input objects 110, 112 in the hovering area 140 or touching a touch sensitive area.

In one example embodiment both touch and hovering inputs are monitored 306, 404, and a combination of touch and hovering inputs may be applied in the source device 200 and/or the target device 210. For example, the transmission of the information item may be started in the source device 200 after first detecting the input object 110, 112 touching the input surface 100 and then hovering in the hovering area 140 (e.g. when moving 304 the information item). The recipient device 210 may be arranged to detect the input object first hovering and then touching the input surface.

In response to detecting an input object arriving substantially from the direction indicated by the received direction information, the input object is identified 404 on the basis of the received direction information as the input object indicated by the source device 200. Identification of an input object may thus refer generally to finding an input object substantially approaching from or moving to a direction (range) indicated in the received direction information. Thus, when an appropriate input object is found 404, the device executing the method of FIG. 4 may identify itself as the intended target device for information item transfer and trigger a monitoring function to detect a release input. It is to be noted that object identification information, such as identifier or property information, may be applied to identify 404 the input object.

In response to detecting 406 a release input 226 by the identified input object, the source device 200 may be caused to be operatively connected 408 to initiate transmission of an information item associated with the object from the source device 200. The target device 210 may send a request (or a response to a request received in block 402) for the source device, triggering the source device to transmit 310 the information item to the source device. Thus, the identification of the target device on the basis of the detected direction of movement may be arranged in the source device by broadcasting or multicasting the information of the initiated information item transfer operation and then identifying the target device on the basis of the received message.

In one example embodiment the apparatus 10 is configured to detect gestures by one or more objects (separately or in combination) in the hovering area 140 above the input surface to trigger a function, such as selection, moving, and/or release of an information item.

Figure 5:
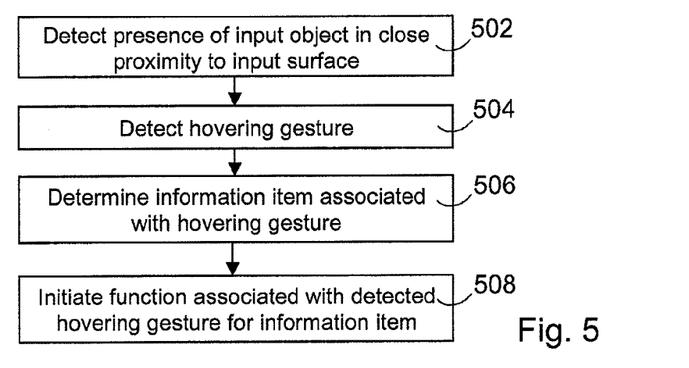

Gesture based inputs may be applied in connection with at least some of the blocks in FIGS. 2 to 4. The example of FIG. 5 illustrates a general method for gesture based inputs and may be applied in the source device 200 and the target device 210. Simultaneous presence of one or more objects in close proximity to an input surface 100 is detected 502. Thus, block 502 may be entered when at least one object 110 has been detected in the hovering area 140, even though physical contact is not made with the input surface. There may be further conditions, such as that the object is within a predefined distance from another object or an input surface of an electronic device.

The example method illustrated in FIG. 5 continuously monitors for hovering gestures. Changes in the proximity sensing field 140 may thus be monitored. A gesture is identified based on the detected changes. In response to detecting 504 a hovering gesture, one or more (target) information items associated with the hovering gesture may be determined 506. A software function currently or temporarily associated with the hovering gesture may be determined and performed 508 for the information item.

In some embodiments the information items are transferred from the source device to the target device on the basis of detected drag and drop hovering gestures. For instance, the features of FIG. 5 may be applied in connection with blocks 302 and 406 to detect a grab hovering gesture as the selection input and a drop hovering gesture as the release input, respectively. As an example, in response to detecting 504 a gesture similar to movement of a finger when double-clicking a mouse button, a GUI element detected as the target of the gesture may be selected. A release input could be detected in response to detecting 504 a gesture of two or more fingers, initially touching each other, receding from each other, for instance.

In one embodiment multi-hovering detection technology is applied to recognize user inputs. The term multi-hovering refers generally to a combination of gestures done with several fingers on top of an input surface, such as a touch screen. Multi-hovering detection may be applied in connection with one or more of the above-illustrated embodiments to detect user inputs.

Figure 6A:
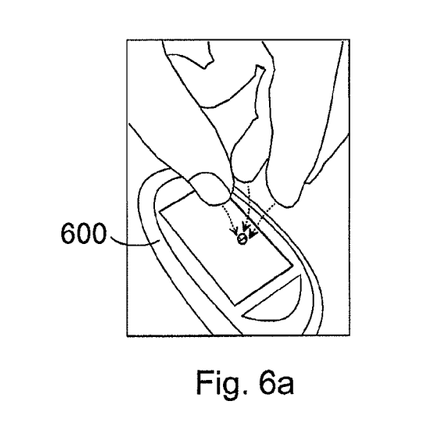
FIGS. 6a to 6c illustrate a sequence of user interface actions according to an example embodiment.
Figure 6B:
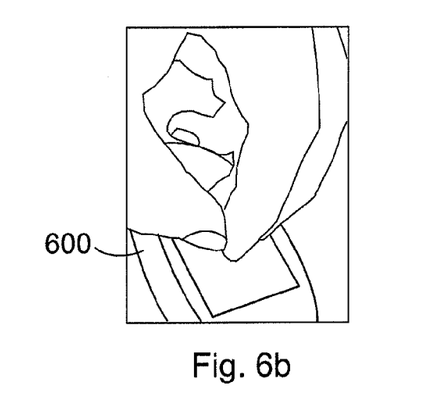
Figure 6C:
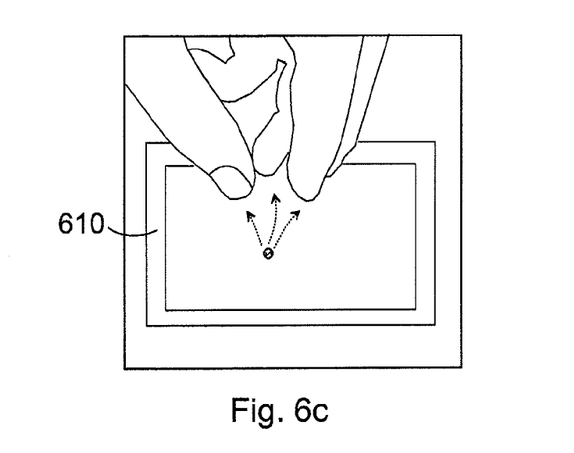

FIGS. 6a to 6c illustrate an example of multi-hovering gestures for triggering transfer of an information item between electronic devices. FIGS. 6a and 6b illustrate a grab gesture: The screen of a source device 600 is first approached with three open fingers. The fingers are put together on top of a GUI item, such as a file icon, on the screen, which is detected as the selection input to select the GUI item and associated information item. The user may thus pick up the GUI item, and move it on the screen towards a target device 610. The source device 600 may be arranged to detect the information item as being held in response to detecting maintained pinch gesture and detect the direction of movement of the fingers.

The user may thus 'lift up' the associated information item and move the (pinched) fingers on top of the target device. As illustrated in FIG. 6c, a release input may be detected by the target device 610 in response to detecting a drop hovering gesture when the user opens the fingers.

The detection of the grab and drop hovering inputs may thus be based on detected distance(s) between at least two fingertips. The distance between fingertips can determined by utilizing output of one or more video cameras, infrared sensor(s), light level sensor(s), or some other appropriate type of sensor(s) (e.g. ultrasound) on the basis of which relative positions of fingertips in hovering area may be detected. Such sensors may be arranged around, or in some cases underneath the display of the electronic device 10, for instance. It is also possible to apply a combination of these methods.

Figure 7A:
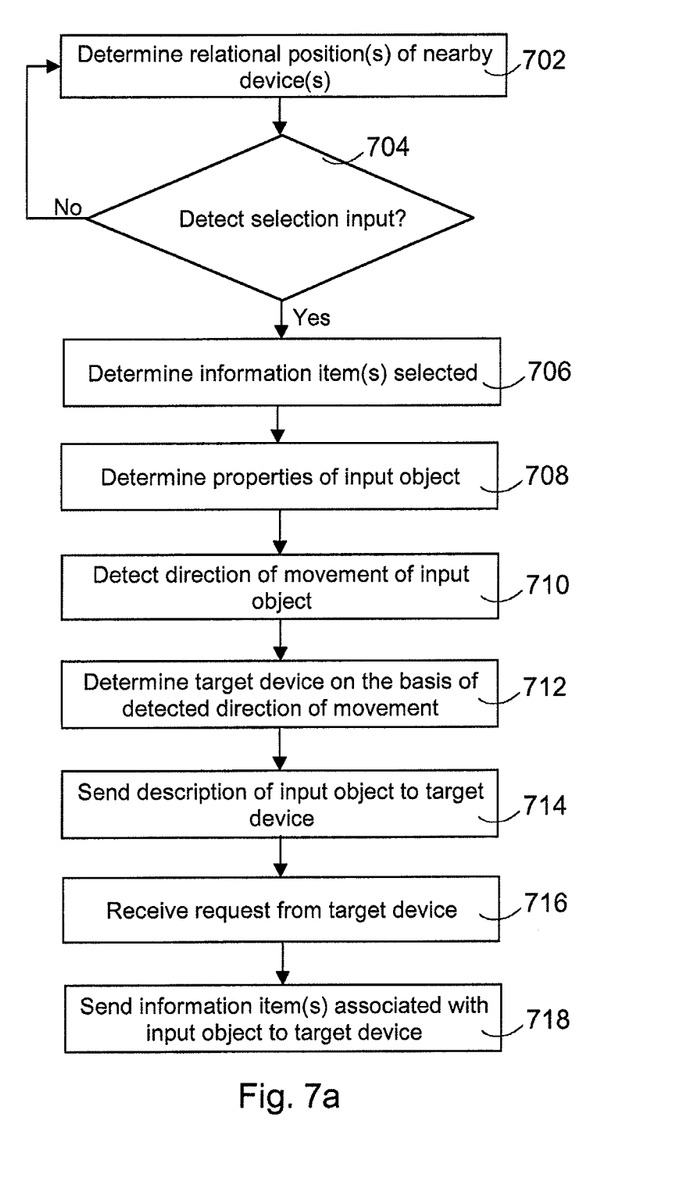
FIGS. 7a and 7b show an example of methods according to an example embodiment.
Figure 7B:
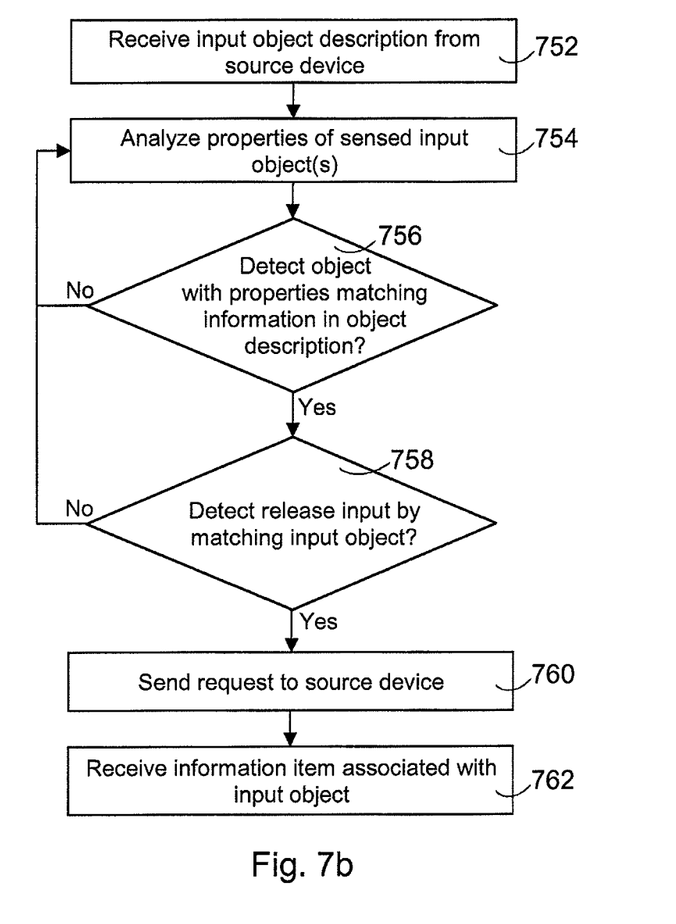

FIGS. 7a and 7b show further example methods for direction based moving of information items between electronic devices. The methods may be applied as control algorithms by the controller 130, for instance.

In one embodiment the source device, such as the device 200 in FIG. 2, is arranged to determine 702 relational positions of detected nearby devices. The positions may be determined in relation to the current orientation of the source device. The devices may perform a monitoring procedure to detect nearby devices and locally exchange position information with detected devices, such as coordinates of each of the devices in relation to a given reference point. Block 702 may be carried out periodically or on the basis of some other trigger. For instance, the source device may be arranged to search for nearby devices and enter block 702 in response to detecting a new device in the proximity of the source device.

The apparatus 10 may comprise one or more positioning sensors for enabling the device to detect the location of other devices relative to its current position, orientation or movement. The apparatus 10 may comprise a positioning system that combines ultrasonic and inertial positioning sensors to detect changes in movement, position, orientation or presence of other devices. For instance, the relative position of the source device 200 with respect to other nearby devices 210 may be measured using ultrasonic signals while inertial positioning sensors are used to detect shifts in movement from the position.

The relative positions of nearby devices may be calculated on the basis of detected distances between one or more sensors affixed at various points of the devices. For instance, the devices may comprise two or more transmitters, located at the middle of a respective device, and two or more receivers located at the corners. In this example, ultrasonic positioning detection starts with an infrared (IR) signal, which is sent by the transmitters uniformly to all directions. This signal serves as a starting point for calculating the ultrasound transmission delay. The IR signal may also have an identification code which identifies the transmitter and informs the other devices whether the transmitter device is stationary or moving. The time difference between the beginning of the IR signal and the instant of reception of the ultrasound burst is used to calculate the distance. In general, transmitted ultrasonic signals may be received with two or more microphones in the apparatus 10. Since the dimensions of the apparatus 10 are known, the distance and the angle of the various nearby transmitters can be calculated using trilateration and clustering techniques. Clustering and trilateration accuracy may be improved by combining the positioning data from different devices. Inertial positioning sensors of the positioning system may be provided by using 3D gyroscopes, 3D accelerometers and 3D compass technology.

The device executing the method of FIG. 7a also monitors an input area, such as the touch screen or hovering area 140, continuously for any user inputs. In response to detecting 704 a selection input, information item(s) associated with the selection input are determined 706.

In some embodiments properties of the input object(s) associated with the detected input are determined 708. For instance, identification information on user's hand, such as fingers and/or wrist, is determined to enable identification of the user of the source device from other users. Some example properties of user's hand include, but are not limited to, left or right hand, skin colour, approximate size (or indication of adult or child hand), configuration of fingers, such as indication of the pinching gesture the fingers are in and how many fingers are applied. However, also other notable descriptors may be applied, such as colour of short sleeve, heat sensor reading of the hand, etc. These determined properties may be stored temporarily in association with the detected selection input and information item. For example, the controller 130 may be arranged to detect such properties of the input object on the basis of analyzing signals from the proximity detection system 120 and/or further sensors, such as one or more video cameras.

Direction of movement of the associated input object 110, 112 is detected 710. This block may be entered in response to detecting movement of the identified input object which provided the selection input. At least one target device is determined 712 on the basis of the detected direction of movement.

In some embodiments the source device determines a description of the input object (which caused the selection input), such as the user's hand, for the target device to identify this input object as the correct one. The description of the input object is transmitted 714 to the target device. The description may comprise property information determined in block 708. This embodiment enables to further avoid errors in case of a plurality of input objects moving substantially to the same direction.

Reference is now made to the example of FIG. 7b illustrating functions in a target device. An object description is received 752 from a source device. The target device is arranged to monitor user inputs, and in response to detecting an object touching the touch screen or detecting an input object in the hovering area 140, properties of such sensed object(s) are analyzed 754.

The detected properties of sensed object(s) are compared 756 with the property information in the received object description. In response to detecting an object with properties adequately matching with the properties in the received object description, the device carrying out the method of FIG. 7b may identify itself as the target device and begin to monitor the input object for a predetermined release input, such as a hovering drop gesture. If the release input is detected 758, a request may be sent 760 to the source device. If the object description was associated with information of the associated information item, the target device may also include this information item identification information with the request in block 760.

Referring again to FIG. 7a, in response to receiving 716 a request from the target device, the source device sends 718 the information item(s) associated with the input object and the selection input to the target device.

As illustrated by block 762 of FIG. 7b, the target device receives the information item associated with the input object which matched the object description (and caused the release input).

As indicated in connection with FIGS. 3 and 4, direction information may be transferred from the source device to the target device. Thus, direction information indicating direction of movement of the input object 110, 112 may also be transferred in connection with or as part of the input object description information in blocks 714, 752. The direction information may be additionally applied by the target device to identify 756 the correct input object. However, also further information may be transferred between the source device 200 and the target device 210, such as information on detected speed of movement of the input object 110, 122. One or more predefined data fields may be applied in the messages between the source device and the target device for each of the applied information types, such as the direction information and the object description.

According to some example embodiments, at least one association to a graphical user interface element to be displayed is modified in response to one or more of the above-illustrated functions, such as one or more of the detected user inputs 302 to 306, 402, 406, 704, and 758. This generally refers to adding and/or modifying visualization of one or more information elements on the display. For instance, a specific GUI is displayed temporarily. Further outputs, such as an audible and/or tactile output may also be produced by the apparatus 10. Thus, the user may be further informed of an ongoing or detected action, such as that the information will be transmitted/received. The user may also be prompted to ensure reception and/or transmission of the information item, and one or more security processes may be carried out before enabling transfer of the information item.

In one example embodiment the transmission and/or receiving of information items between the devices may apply only to some of the items displayed on the screen of the apparatus 10. The controller 130 may be arranged to inform the user of which UI objects support this possibility.

At least some of the above-illustrated features may be applied in connection with user interfaces providing 3D interaction, or sense of 3D interaction. For instance, various autostereoscopic screens may be applied. The proximity detection system 120 may be configured to estimate the distance between of the input object 110, 112 and the input surface 100 and select an action, such as one or more of the above-indicated user inputs by the input object, dependent on the distance.

In a two dimensional (2D) GUI, items are located next to each other. In a 3D GUI, individual items can also be placed on top of each other, or so, that certain items are located higher or lower than others. It may be desirable for a user to select several GUI items simultaneously. A variation of multi-hovering touch is to mark a multi-dimensional area and moving it on the touch screen, for example to mark or select multiple items simultaneously with a single "formation" of fingers. The tips of the fingers form the edges of a 2D polygon or a 3D shape. The selection may be arranged in various ways, for instance: Two fingers are detected to form a vector in a 2D space (the finger tips are at same height) or 3D space (the finger tips are at different height). All GUI items that fall within this vector are selected. Three fingers may be detected to form a triangle in 2D space (same height) or 3D space (different heights). All GUI items that fall within the triangle may be selected. For instance, the controller 130 of FIG. 1 may be arranged to determine the positions of the finger tips and the forming area on the basis of signals from the proximity detection system 120 and/or further sensor(s).

Figure 8:
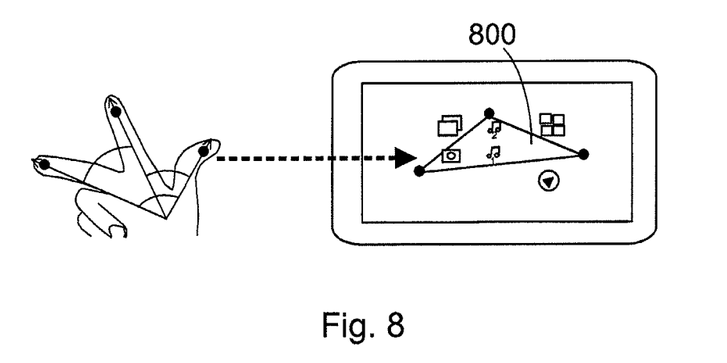
FIG. 8 illustrates selection of user interface elements according to an example embodiment.

FIG. 8 illustrates an example of such marking and detection of an area 800 and multiple icons and associated information items in the area by three fingers. A still further example is that four fingertips are detected to form a polygon in 3D space. Such selection may be applied in connection with block 302, 704 to select the information item(s), for instance. The selected information items may be moved in the direction of the target device, and the 3D GUI may illustrate moving of the selected (3D) objects with the input object.

To supplement multi-hovering touch, an alternative way for marking a three-dimensional area on a touch screen is to measure the pressure level of each finger touching the screen: the stronger pressure is applied, the lower that point goes in the 3D space of the GUI.

In one example embodiment the user of the source device is informed of potential target devices. For instance, the source device 200 of FIG. 2 detects the nearby device 210, determines the relative position of this potential target device 210, and displays detected identification and position information. In one embodiment an icon or other representation of the potential target device is positioned on the display to indicate the direction in which the potential target device currently resides, on the basis of the current orientation of the source device. The user may then start to move the icon to the indicated direction and the target device may be identified. For example, a 2D/3D icon of the potential target device positioned to indicate the direction is displayed. Further, also the distance of the potential target device may be estimated and indicated for the user. For example, the size of the target device icon may be changed in accordance with the detected distance. If the position of the devices or the orientation of the source device is changed, the display position may also be updated accordingly.

In one example embodiment the user of a target device 210 is informed of a source device. For example, after block 402 the target device could indicate on its screen the direction (and also e.g. the name) of the source device. In one embodiment this source device information is displayed after detecting (e.g. in block 404) an input object, such as user's hand on top of the target device. Also identification information on the information item may be displayed. For example, name or icon of the information item may be displayed in the target device screen, e.g. on top of the source device icon. The benefit is that now the user knows that the target device is ready to receive information item(s), and is waiting for release input, such as the finger release gesture illustrated in connection with FIG. 6. Further, the user may know from which device the items are coming.

A broad range of functions is available for selection to be associated with an input, such as the selection or release input, detected by a touch sensitive detection system and/or the proximity detection system 120. The controller 130 may be configured to adapt the associations according to a current operating state of the apparatus 10, a user input or an application executed in the apparatus 10, for instance. For instance, associations may be application specific, menu specific, view specific and/or context (which may be defined on the basis of information obtained from the current environment or usage of the apparatus 10). The above-illustrated features may be applied for different applications and applications modes. Some examples of applications for which particular advantages are available include browser applications, device management applications, file management applications, media content related applications and services, applications utilizing augmented reality interactions, social networking applications, and the like.

Figure 9:
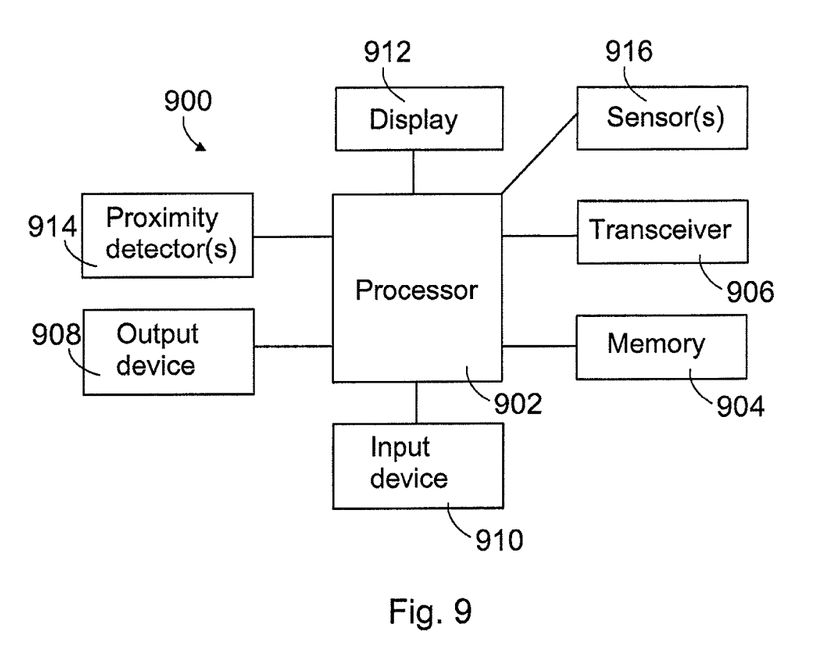
FIG. 9 illustrates an electronic device in accordance with an example embodiment.

FIG. 9 shows a block diagram of the structure of an electronic device 900 according to an example embodiment. The electronic device may comprise the apparatus 10, 200, 210. Although one embodiment of the electronic device 900 is illustrated and will be hereinafter described for purposes of example, other types of electronic devices, such as, but not limited to, portable digital assistants (PDAs), pagers, mobile computers, desktop computers, laptop computers, tablet computers, media players, televisions, gaming devices, cameras, video recorders, positioning devices, electronic books, wearable devices, projector devices, and other types of electronic systems, may employ the present embodiments.

Furthermore, the apparatus of an example embodiment need not be the entire electronic device, but may be a component or group of components of the electronic device in other example embodiments. For example, the apparatus could be in a form of a chipset or some other kind of hardware module for controlling by performing at least some of the functions illustrated above, such as the functions of the controller 130 of FIG. 1.

A processor 902 is configured to execute instructions and to carry out operations associated with the electronic device 900. The processor 902 may be arranged to carry out at least part of the control functions illustrated above for the controller 130. The processor 902 may comprise means, such as a digital signal processor device, a microprocessor device, and circuitry, for performing various functions including, for example, one or more of the functions described in conjunction with FIGS. 1 to 7b. For example, the processor 902 may be arranged to perform at least part of the functions of the controller 130 of FIG. 1. The processor 902 may control the reception and processing of input and output data between components of the electronic device 900 by using instructions retrieved from memory. The processor 902 can be implemented on a single-chip, multiple chips or multiple electrical components. Some examples of architectures which can be used for the processor 902 include dedicated or embedded processor, and an application specific integrated circuit (ASIC).

The processor 902 may comprise functionality to operate one or more computer programs. Computer program code may be stored in a memory 904. The at least one memory and the computer program code may be configured to, with the at least one processor, cause the apparatus to perform at least one embodiment including, for example, one or more of the functions described above in conjunction with FIGS. 1 to 8. Typically the processor 902 operates together with an operating system to execute computer code and produce and use data.

By way of example, the memory 904 may include nonvolatile portion, such as electrically erasable programmable read only memory (EEPROM), flash memory or the like, and a volatile portion, such as a random access memory (RAM) including a cache area for temporary storage of data. The information could also reside on a removable storage medium and loaded or installed onto the electronic device 900 when needed.

The electronic device 900 may comprise an antenna (or multiple antennae) in operable communication with a transceiver unit 906 comprising a transmitter and a receiver. The electronic device 900 may operate with one or more air interface standards and communication protocols. By way of illustration, the electronic device 900 may operate in accordance with any of a number of first, second, third and/or fourth-generation communication protocols or the like. For example, the electronic device 900 may operate in accordance with one or more wireline protocols, such as Ethernet and digital subscriber line (DSL), with second-generation (2G) wireless communication protocols, such as IS-136 (time division multiple access (TDMA)), Global System for Mobile communications (GSM), and IS-95 (code division multiple access (CDMA)), with third-generation (3G) wireless communication protocols, such as 3G protocols by the Third Generation Partnership Project (3GPP), CDMA2000, wideband CDMA (WCDMA) and time division-synchronous CDMA (TD-SCDMA), with fourth-generation (4G) wireless communication protocols, such as the Long Term Evolution (LTE) Advanced protocols, wireless local area networking protocols, such as IEEE 802.11, wireless personal area network (WPAN) protocols, such as Bluetooth (or another protocol by the IEEE working group 802.15), IrDA, Z-Wave, ZigBee, and/or the like. The processor 902 may control the transceiver unit 906 to connect another (source or target) communications device and communicate above-illustrated information with the other communications device by using a data transfer service provided by the transceiver unit 906. For example, Bluetooth radio may also be applied for detecting nearby devices. After detecting 308 the target device on the basis of the direction of movement, the target device may be connected by a wireless local area network (WLAN) or wireless personal area network (WPAN) connection, for example.

The user interface of the electronic device 900 may comprise an output device 908, such as a speaker, one or more input devices 910, such as a microphone, a keypad or one or more buttons or actuators, and a display 912 for displaying information in two or more dimensions.

The input device 910 may comprise a touch sensing device configured to receive input from a user's touch and to send this information to the processor 902. Such touch-sensing device may be configured to recognize also the position and magnitude of touches on a touch sensitive surface. The touch sensing device may be based on sensing technologies including, but not limited to, capacitive sensing, resistive sensing, surface acoustic wave sensing, pressure sensing, inductive sensing, and optical sensing. Furthermore, the touch sensing device may be based on single point sensing or multipoint sensing. In one embodiment the input device is a touch screen, which is positioned in front of the display 912. The input device 910 may be configured to provide information on movement of an input object on an input surface of the input device 910 for the processor 902.

The display 912 could be of any type appropriate for the electronic device 900 in question, some examples include plasma display panels (PDP), liquid crystal display (LCD), light-emitting diode (LED), organic light-emitting diode displays (OLED), projectors, holographic displays and the like.

The electronic device 900 may also comprise a proximity detection system 914, such as the system 120 illustrated earlier, operatively coupled to the processor 902. The proximity detection system 914 is configured to detect when a finger, stylus or other pointing device is in close proximity to, but not in contact with, some component of the computer system including for example housing or input/output (I/O) devices, such as the touch screen. Hovering could be arranged even above a surface on which display is projected. For instance, cameras could be used to detect the proximity and position of fingers. The proximity detection system 914 may be configured to provide information on movement of a hovering input object for the processor 902.

The electronic device 900 may comprise one or more further sensors 916, such as one or more above illustrated sensors. For instance, the sensor 916 could be a magnetometer the output of which may be used when determining 702 direction of the electronic device 900 in relation to other nearby devices.

The electronic device 900 may comprise also further units and elements not illustrated in FIG. 9, such as further interface devices, a battery, a media capturing element, such as a camera, video and/or audio module, and a user identity module.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 9. A computer-readable medium may comprise a computer-readable storage medium that may be any media or means that can contain or store the instructions for use by or in connection with an instruction execution system, apparatus, or device, such as a computer.

If desired, at least some of the different functions discussed herein may be performed in a different order and/or concurrently with each other. As one example, block 708 of FIG. 7*a* may be executed later, for instance in connection with block 714. Furthermore, if desired, one or more of the above-described functions may be optional or may be combined. For instance, one or more of the functions illustrated in connection with FIGS. 7*a* and 7*b* may be applied separately from the remaining functions in these Figures. Another example is that the blocks of FIG. 5 may be applied in connection with FIGS. 7*a* and 7*b* to arrange hovering based input detection.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
searching by a source device for other nearby devices,
determining by the source device positions of nearby devices in relation to the position of the source device,
detecting by a source device a selection input by an input object selecting an information item,
detecting direction of movement of the input object after the selection input,
identifying a target device on the basis of the direction of movement of the input object, and
causing an operative connection with the target device for transferring the information item to the target device, wherein the input object is a user's hand, the source device determines a description of the user's hand, and the source device causes transmission of the description to the target device.

2. The method of claim 1, wherein presence of the input object in close proximity to an input surface is detected,
the detection of the selection input is arranged based on detecting a grab hovering gesture by the input object, and
the detection of the direction of movement of the object is arranged based on detecting the direction of hovering of the input object.

3. The method of claim 1, wherein
at least one device positioned in the direction of the movement of the input object is selected as the target device, and
in response to detecting movement of the input object towards the target device, informing the target device of the approaching input object and/or the information item.

4. The method of claim 1, wherein information on at least the detected direction is transmitted to at least one other device, and
the information item is transmitted to the target device in response to the target device requesting the information item.

5. A method, comprising:
receiving direction information associated with direction of movement of an input object from a source device,
determining the input objects is in proximity of an input surface of a target device and is moving in a same direction as indicated by the direction information,
in response to determining the input object is moving in the same direction as indicated in by direction information, activating a hovering gesture sensing functionality, and
in response to detecting a drop hovering gesture by the input object based on the hovering gesture sensing functionality, causing an operative connection with the source device to initiate transmission of an information item associated with the input object from the source device.

6. The method of claim 5, wherein an input object description is received from the source device, and
the input object is further identified on the basis of the received input object description.

7. An apparatus, comprising:
at least one processor; and
at least one memory including computer program code,
the at least one memory and the computer program code configured to, with the at least one processor, cause the apparatus at least to perform:
search for other nearby devices,
determine positions of nearby devices in relation to the position of the source device,
detect a selection input by an input object selecting an information item,
detect direction of movement of the input object after the selection input,
identify a target device on the basis of the direction of movement of the input object, and
cause an operative connection with the target device for transferring the information item to the target device, wherein the input object is a user's hand, the source device determines a description of the user's hand, and the source device causes transmission of the description to the target device.

8. The apparatus of claim 7, wherein the apparatus is configured to detect presence of the input object in close proximity to an input surface,
the apparatus is configured detect a grab hovering gesture by the input object, and
the apparatus is configured to detect the direction of hovering of the input object.

9. The apparatus of claim 7, wherein
the apparatus is configured to select at least one device positioned in the direction of the movement of the input object, and
the apparatus is configured to inform the target device of the approaching input object and/or the information item in response to detecting movement of the input object towards the target device.

10. The apparatus of claim 7, wherein the apparatus is configured to transmit information on at least the detected direction to at least one other device, and
the apparatus is configured to transmit the information item to the target device in response to the target device requesting the information item.

11. An apparatus, comprising:
at least one processor; and
at least one memory including computer program code, the at least one memory and the computer program code configured to, with the at least one processor, cause the apparatus at least to perform:

receive direction information associated with direction of movement of an input object from a source device, determine the input object is in proximity of an input surface of a target device and is moving in a same direction as indicated by the direction information, in response to determining the input object is moving in the same direction as indicated by the direction information, activate a hovering gesture sensing functionality, and in response to detecting a drop hovering gesture by the input object based on the hovering gesture sensing functionality, cause an operative connection with the source device to initiate transmission of an information item associated with the input object from the source device.

12. The apparatus of claim 11, wherein the apparatus is configured to receive an input object description from the source device, and the apparatus is configured to identify the input object further on the basis of the received input object description.

13. The apparatus of claim 12, wherein the input object description is a hand description, and the apparatus is configured to carry out a hand matching process to identify a hand on the basis of the hand description.

14. The apparatus of claim 11, wherein the apparatus is configured to determine positions of nearby devices in relation to itself, and the apparatus is configured to select at least one device positioned in the direction of the movement of the input object as the source device.

15. The apparatus of claim 11, wherein the apparatus is configured to detect presence of at least two fingers in close proximity to an input surface, the apparatus is configured to define a selection area between the fingers, and the apparatus is configured to select information items associated with the selection area.

16. The apparatus of claim 15, wherein the apparatus is configured to define the selection area in three dimensions on the basis of detecting three or more input objects at least partly at different heights.

17. The method of claim 1, further comprising:

detecting presence of at least two fingers in close proximity to an input surface, defining a selection area between the fingers, and selecting information items associated with the selection area.

18. The method of claim 17, wherein the selection area is defined in three dimensions on the basis of detecting three or more input objects at least partly at different heights.

19. The apparatus of claim 7, wherein the apparatus is a mobile communications device comprising a touch screen.

* * * * *